United States Patent [19]

Merian

[11] 3,775,175
[45] Nov. 27, 1973

[54] ENAMELED WIRE LUBRICATED WITH POLYETHYLENE

[75] Inventor: Jacques S. Merian, Pittsburgh, Pa.

[73] Assignee: Westinghouse Electric Corporation, Pittsburgh, Pa.

[22] Filed: Mar. 15, 1972

[21] Appl. No.: 234,869

Related U.S. Application Data

[63] Continuation-in-part of Ser. No. 855,715, Sept. 5, 1969, abandoned.

[52] U.S. Cl. .................................. 117/218, 117/75
[51] Int. Cl. .......................... H01b 3/30, B44d 1/42
[58] Field of Search ...................... 117/218, 232, 45, 117/75, 128.4; 260/94.9

[56] References Cited
UNITED STATES PATENTS

| | | | |
|---|---|---|---|
| 3,413,148 | 11/1968 | Sattler et al. | 117/218 |
| 3,555,113 | 1/1971 | Sattler | 260/841 |
| 3,652,471 | 3/1972 | Sattler | 117/232 X |
| 3,330,684 | 7/1967 | Wheeler | 117/38 |
| 3,399,071 | 8/1968 | Schaufelberger et al. | 117/45 |
| 3,516,859 | 6/1970 | Gerland et al. | 117/128.4 X |
| 3,649,441 | 3/1972 | Strange et al. | 117/128.4 X |

OTHER PUBLICATIONS

"Bakelite Polyolefin Resin," Union Carbide, F41730 Sept. 1967, pp. 1–4.

*Primary Examiner*—William D. Martin
*Assistant Examiner*—Harry J. Gwinnell
*Attorney*—F. Shapoe et al.

[57] ABSTRACT

A lubricated enameled wire is made by preparing a dispersion of polyethylene containing a volatile suspending agent, mixing the dispersion with a wire enamel, applying the mixture to a wire, and heating the mixture to a degree sufficient to evaporate the suspending agent and to cause the wire enamel to harden when cooled. The polyethylene migrates to the surface to form a slippery coating which is an integral part of the wire enamel. The coating protects the enamel from damage particularly when the wire is wound with automatic machinery. The enamel retains its original physical, electrical, thermal, and other properties and its ability to be bonded with varnish.

9 Claims, 2 Drawing Figures

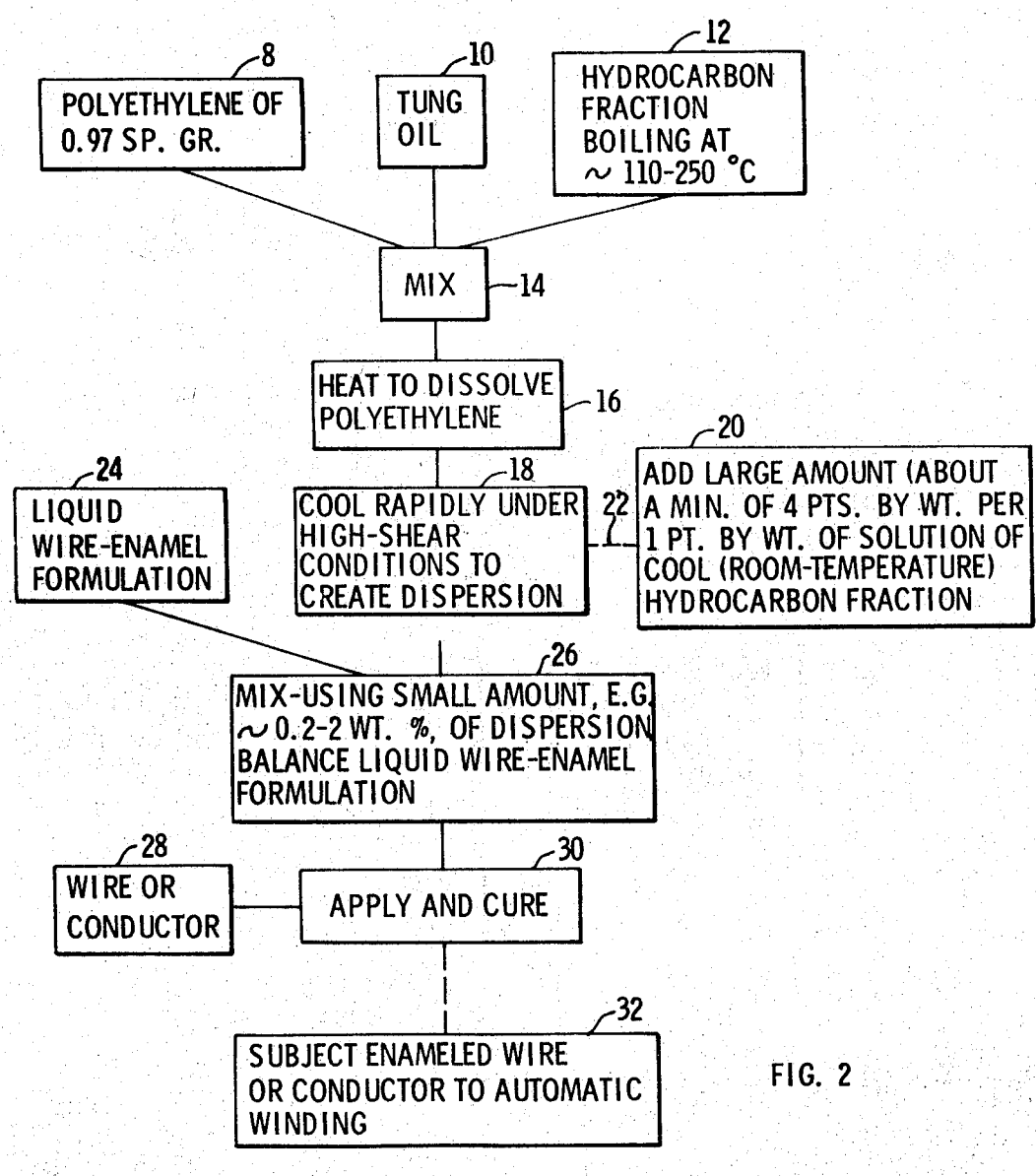

ENAMELED WIRE LUBRICATED WITH POLYETHYLENE

CROSS-REFERENCE TO RELATED APPLICATION

This application is a continuation-in-part of my co-pending applicaton, Ser. No. 855,715, filed Sept. 5, 1969, entitled "Enameled Wire Lubricated with Polyethylene of 0.97 Specific Gravity," and now abandoned.

BACKGROUND OF THE INVENTION

In a wire enameling process a wire is passed into a bath containing a wire enamel and then through a die or between a pair of squeegees or the like to remove excess enamel from the wire. The wire is then passed upward through an electrically heated or gas-fired oven for perhaps 6 to 25 feet to evaporate solvents and cure the layer of enamel on it, then over a pulley and downward into the liquid enamel again. Usually the wire is given about four to six successive coats, each being cured before the next is applied.

The enameled wire is then made into coils for electrical motors by means of a vertical automatic winding machine. Such a machine imposes severe mechanical abrasion and stretching strains on the enameled wire. If the enameled wire is used in the winding machines without lubrication, a slow winding speed is required in order to avoid a large percentage of defective work. For this reason, lubricants are applied to the surface of the wire before in enters the winding machine. While minieral oil, silicone resins, and polyamide resins have been used as lubricants, the best lubricant is believed to be polyethylene.

In U.S. Pat. 3,413,148, for example, polyethylene is applied to the surface of the wire from a suspension by passing the wire through a bath of the suspension, wiping the excess off, and evaporating the suspending agent. But the resulting coating of polyethylene is very flaky and readily comes off. As the patent suggests, the situation can be improved somewhat by passing the wire through the tower again to fuse the polyethylene on the wire. Doing this may decrease the production of the enameled wire since a tower can only handle a limited number of passes. Controlling the amount of polyethylene deposited is difficult since it is difficult to wipe off the exact amount of the suspension required to leave a uniform coating. Therefore much polyethylene is wasted because excess polyethylene must be applied to the wire to provide for a margin of safety. In addition, the process of U.S. Pat. 3,413,148 cannot be used on wire enamel overcoated with a cement coat since cement coats are usually thermoplastics, and the suspending agent will dissolve the cement coat.

SUMMARY OF THE INVENTION

I have found that a superior lubricating coating of polyethylene on an enameled wire can be obtained if a dispersion of the polyethylene is mixed with the wire enamel before the wire enamel is applied to the wire. The polyethylene is believed to gradually migrate to the enameled surface to supply a continuous source of lubrication.

Surprisingly, the polyethylene suspension in no way interferes with the application of the wire enamel to wire, and in no way reduces or alters the physical or electrical properties of the resulting enamel. Moreover, even when the preferred polyethylene is used, which has a very low coefficient of friction, the presence of the polyethylene on the surface does not affect the ability of varnishes to adhere to coils made of the enameled wires.

Although applying a polyethylene dispersion to an enameled wire and mixing it into the wire enamel both result in a coating of polyethylene on the wire, there are considerable differences in the properties of the two coatings. First, the wires are completely different to the touch. The prior art wire feels sticky and squeeky and polyethylene readily comes off onto one's fingers. The wire of this invention feels smooth and slick and no polyethylene comes off on the fingers. These differences are very important to an engineer making motor windings, for if the polyethylene is sticky it may not wind smoothly even though it protects the enamel. But more important, polyethylene which comes off could prevent the varnish from adhering to the winding. In a hermetically sealed motor it could also dissolve in the Freon, precipitate, and clog the motor cooling system.

Since the polyethylene is mixed into the enamel, the amount of polyethylene can be precisely controlled and therefore much less polyethylene is required, no excess is needed for a margin of safety, and none is wasted. It is surprising that a better polyethylene coating is obtained with the process of this invention even though it requires less polyethylene. Less polyethylene also means less expense and that less polyethylene is present to dissolve in a hermetically sealed motor, thereby reducing the danger of clogging. It is also surprising that the method of this invention produces a coating with a lower coefficient of friction than does the method of U.S. Pat. 3,413,148 even when the identical polyethylene dispersion and wire enamel are used.

Finally instead of having two baths, one for the enamel and one for the polyethylene dispersion, only a single bath is required and the additional pass through the tower is eliminated.

DESCRIPTION OF THE INVENTION

A complete understanding of the invention may be had from the foregoing and following description thereof, taken together with the appended drawings, in which:

FIG. 1 is a representation of an insulated electrical conductor made in accordance with the present invention; and FIG. 2 is a flow diagram of the preferred method of the present invention.

Referring to FIG. 1, there is shown an insulated electrical conductor 2, comprising a centrally located electrical conductor 4, which may be of No. 18 AWG copper wire or the like, and on its exterior a coating 6, comprising a resinous enamel insulation. As will become apparent from the further description of the invention hereinbelow, the coating layer 6 has at its exterior surface a number of particles of polyethylene preferably of 0.97 specific gravity, i.e., a polyethylene of the kind disclosed in U.S. Pat. 3,330,684. This kind of polyethylene, in common with other kinds of polyethylene, is incompatible with the resinous enamel insulation material of the layer 6, and when added to it in the form of a fine dispersion, the polyethylene migrates to the exterior surface of the layer 6, serving there as a lubricant. Although it may be possible in some instances to utilize a quantity of the 0.97 specific gravity polyethylene such that there will be developed on the exterior of the coating layer 6 a continuous and discrete layer thereof, it is by no means essential to the practice of the invention that this is done. Instead, in most instances, the amount of polyethylene used is so small as to form a uniformly distributed, but exceedingly thin, layer on the exterior of the layer 6, and because of the extreme thinness of this layer (an estimated 0.2 to 1.0 percent of total insulating film), it has been decided not to show the layer of polyethylene in the drawing of FIG. 1. Those skilled in the art will appreciate, moreover, that a substantial improvement is obtained, in comparison with the use of no lubricant at all, even if the amount of the polyethylene of 0.97 specific gravity is so small that it is present nonuniformly, that is, in patches here and there along the exterior surface 6 of the insulated conductor 2. In a preferred way of practicing the invention, however, the wire or conductor has applied to it a resinous enamel insulation that contains a suitable amount of the polyethylene of 0.97 specific gravity, namely, about 0.2–2 weight percent, such that a suitable and uniform but very thin coating on the polyethylene is developed on the exterior of the insultated conductor 2 during the enamel-curing operation, as will be explained hereinbelow.

Referring now to FIG. 2, which comprises a flow diagram of the preferred method of the invention, there are indicated by the blocks 8, 10 and 12, respectively, the polyethylene, tung oil, and hydrocarbon fraction that comprise the preferred materials for the making of the dispersion, as is required in the practice of the method of this invention.

The polyethylene is preferably, in accordance with this invention of the kind indicated in U.S. Pat. 3,330,684 namely one of a very high specific gravity (about 0.97 grams per cubic centimeter), with the polyethylene also being characteristics by being in the form of dendritic spherulites of polyethylene having a density of at least 0.97, a molecular weight indicated by a melt viscosity of at least 50 centipoises and a melt index at least six, such spherulites having an average particle size of less than 50 microns in any dimension. A suitable material answering this description is sold commercially by Union Carbide Corporation, New York, under the designation "Bakelite Polyolefin CPR-1." The use of other polyethylene, in place of the particular polyethylene described above, is not preferred since the other polyethylenes do not yield a coefficient of friction nearly so low as that obtained with the particular polyethylene mentioned above although the results are nevertheless better than when a polyethylene dispersion is applied to the surface of an enameled wire.

A dispersion of polyethylene is prepared which contains a volatile suspending agent. The suspending agent preferably is a mixture of liquids which have boiling points ranging from about 110°–250°C so that they are gradually volatilized as the temperature increases in the tower, which prevents the formation of blisters. For example, in block 12, there is indicated as being used a hydrocarbon fraction boiling at about 110°–250°C. Various kinds of oil, mineral oil, mineral spirits, or hydrocarbon solvent material may be used, among which there may be mentioned particularly the aromatic hydrocarbon fraction that has a boiling range of 154°–177°C at atmosphere pressure and is sold commercially under the name "Solvesso 100." Among other solvents that may be used may be mentioned xylene, toluene, diisobutyl ketone, "Solvesso 150", "Varsol", "Magie 535" oil, "Magie 470" oil and "Mineral Spirits 1609–2."

The suspension also preferably contains a drying oil which acts as a stabilizer to prevent settling. Although the drying oil in block 10 has been indicated as being tung oil, those skilled in the art will appreciate that other long-chain unsaturated oils and drying oils may, in some instances, be used.

As indicated by the block 14, the components of the blocks 8, 10 and 12 are then mixed, in suitable proportions.

The proportions are not particularly critical. I have used 1 part each by weight of the polyethylene and the tung oil together with 2 parts by weight of hydrocarbon fraction, and I have also, on another occasion, used 4 parts by weight of polyethylene, 1 part of tung oil, and 8 parts of hydrocarbon fraction. In each case upon suitable heating, to about a temperature of 120°–130°C, there was obtained a suitable clear solution of dissolved polyethylene, as indicated by the block 16 in the flow diagram.

The next step in the method of the invention comprises, as is indicated by the block 18, cooling the dissolved polyethylene rapidly under high-shear conditions to create a dispersion. As those skilled in the art will appreciate, this may be done by such practices as quench-cooling in a watercooled three-roll mill or by placing a small container of the hot solution in an ice bath while agitating the solution with a high-speed stirrer. A blender or a Cowles Dissolvers may be used.

Preferably, but not necessarily, there is used a step indicated by the block 20, in accordance with which a large amount, about a minimum of 4 parts by weight per 1 part by weight of solution, of cool (room-temperature) hydrocarbon fraction is added to the hot dissolved polyethylene solution while it is being rapidly stirred or agitated. As is indicated at 22, and as will be understood from the description of the various ways of conducting step 18, this practice is optional, but it has the advantage of saving the necessity of working with small quantities or providing for the use of substantial quantities of ice or of expensive water-cooled equipment.

As indicated by the block 24, there is provided a liquid wire-enamel formulation, of the kind that is applied to a wire or conductor and then suitably cured or hardened thereon, usually in multiple layers, to obtain a resinous enamel insulation on the electrical wire or conductor. Those skilled in the art are familiar with a great number of different kinds of suitable liquid wire-enamel formulations, and any of them may be used in this invention. Among the known kinds of wire-enamel formulation are the polyvinyl acetals, the aromatic polyamides, the epoxies, the polyurethanes, the polyesters, polyamide-imides, and polyesteramide-imides. The term "wire enamel" as used herein is intended to include cement coats such as polyvinyl-butyral, silicone-based resins, etc. Particularly favorable results may be obtained with the use of a polymeric-amide-imide ester wire-enamel blended with an ester-urethane isocyanate, as taught in the copending application of Frank A. Sattler, Ser. No. 730,833 filed May 21, 1968, issued on Jan. 12, 1971 as U.S. Pat. 3,555,113.

As indicated by the block 26, the dispersion which is made as indicated in block 18 is mixed with the wire-enamel formulation of block 24, using a small amount, for example, about 0.2–2 weight percent of the dispersion, with the balance being the liquid-wire-enamel formulation.

As indicated by the block 28, there is provided a wire or conductor, such as No. 18 AWG copper wire, and as is indicated by the block 30, the dispersion-containing-wire-enamel formulation is then applied to the wire or conductor 28 and cured or hardened. As was described above in connection with the prior art the curing step is done in an enameling tower, such that the wire or conductor 28 is subjected to several successive passes, a small build of the dispersion-containing wire-enamel formulation being brought onto the wire or conductor and then cured as it passes upward in the enameling tower. It is preferable to include the polyethylene dispersion only in the wire enamel used in the last pass since polyethylene in earlier passes is unnecessary and wasted. If an overcoat is used, it is again preferable to use the polyethylene dispersion only in the overcoat. If the polyethylene is used in only the last pass, it could constitute 0.03 percent or less of the total enamel.

A particular advantage of the present invention is that the steps described above will cooperate to produce an electrical wire or conductor having a resinous enamel insulation thereon that is eminently suitable for subsequent use in automatic winding equipment, without the necessity of applying to the surface of the enameled wire or conductor any lubricant, either as it leaves the enameling tower or as it enters the winding machine. Instead, the polyethylene being incompatible with the remaining components of the wire-enamel formulation and being in finely divided form, migrates during the curing operation to the exterior of the enameled wire or conductor. It then serves there as a lubricant and in particular, its properties as respects coefficient of friction surpass those of the other lubricants that have been hitherto used.

In FIG. 2, the final block 32 indicates the optional step, wherein the desirable properties of an insulated wire or conductor as shown in FIG. 1 and made as described herein, are most especially noticed and appreciated.

The invention described above is illustrated by the following specific examples.

EXAMPLE I

A dispersion was made by mixing 50 grams of polyethylene of 0.97 specific gravity (such as that sold by Union Carbide Corporation under the trademark "Bakelite CPR-1)", 50 grams of tung oil, and 100 grams of "mineral spirits 1609-2," namely, an aliphatic petroleum fraction boiling in the range 152° to 179°C at atmospheric pressure. This mixture was heated to about 125°C, with stirring, until a homogeneous solution was obtained, which takes only a few minutes.

Into a blender there was placed a quantity (450 grams) of said aliphatic petroleum fraction, this being at room temperature. With the blender running, the hot solution was slowly added to the blender, over a period of several minutes. This effected rapid cooling of the hot melt under conditions of high shear and resulted in the production of a dispersion of the polyethylene of 0.97 specific gravity within a medium such that the dispersion may be added without untoward result to a liquid wire-enamel formulation.

There was prepared a liquid wire-enamel formulation to which the above-mentioned dispersion was added. This was done by following the procedure of Example 40 in the copending application of Frank A. Sattler, Ser. No. 730,833, filed May 21, 1968 issued on Jan. 12, 1971, as U.S. Pat. 3,555,113. It will suffice here to indicate that the wire-enamel formulation thus made comprised, on the basis of weight percent of contained solids, about 40 percent of a polyester-amide-imide made by the reaction of trimellitic anhydride with a little ethylene glycol, followed by the reaction of additional trimellitic anhydride with m-phenylenediamine; 32.9 percent of a polyester material made by the reaction of trimellitic anhydride with ethylene glycol; 20 percent of a compatibilizing agent made by the reaction of 1 mol of tolylene diisocyanate with 2 mols of dimethyl terephthalate, end-blocked with 2 mols of tris-(2-hydroxyethyl)-isocyanurate; 4.6 percent of a phenolic resin made by the reaction of cresol and formaldehyde; and 2.5 percent of tetra-isopropyl titanate as catalyst, all suspended or dissolved in a suitable mixture of solvent (cresylic acid) and diluent (aromatic petroleum fraction boiling under atmospheric pressure at 160° to 177°C, such as that sold commercially under the name "Solvesso 100)" so as to have a room-temperature viscosity of about 8 poises.

The dispersion was added to the wire-enamel formulation in such amount that the contained polyethylene of 0.97 specific gravity amounts to 1.0 percent on the basis of weight of contained solids, of the final mixture.

The wire-enamel formulation, having the polyethylene incorporated therein as indicated above, was then used to coat AWG No. 18 copper wire in a 15 foot enameling tower operating at a hot-spot temperature of 400°C and with a line speed of 22 feet per minute. The wire made six passes through the wire-enamel formulation, passing immediately thereafter through a die that leaves thereon an uncured coating about 1.2 mils thick, and thence upward through the tower, to be cured in such upward passage. as a result, there issued from the enameling tower a wire conductor having thereon a cured, resinous insulation of the wire-enamel type, about 1.5 mils thick.

Enameled wire so produced was tested for coefficient of friction, which is a good indication of the potential performance of the wire when wound onto a core by means of automatic winding machinery. The coefficient of friction was determined once with a 230 gram weight and again with a 31.5 gram weight. Wire enameled with a wire-enamel formulation containing the 0.97 specific gravity polyethylene and made as described above displayed a coefficient of friction of 0.043 in the test with the 230 gram weight and of 0.063 in the test with the 31.5 gram weight. In comparison, wire enameled with the same composition, but with the step of adding the dispersion of 0.97 specific gravity polyethylene omitted, yielded values of 0.12 and 0.138, respectively. This means that when the wire is treated in accordance with this invention, it has a coefficient of friction on the order of 30 to 50 percent of that of the wire enameled with a formulation otherwise the same but without the polyethylene and not otherwise lubricated (e.g., with mineral oil), and this is achieved without the need for a separate lubricant-applying operation. In comparison with magnet wire lubricated with silicone or nylon, using a separate lubricant-applying step and its necessary associated equipment, the magnet wire produced in accordance with the above example exhibits a substantially lower coefficient of friction.

In the trials of this invention on a 24 foot enameling tower, there was dramatic evidence of the improved lubricating action obtained with the use of the present invention. The enameled wire issuing from the tower is taken up on a spool. The spool has a central cylindrical portion about 6 inches in diameter and 6 inches long, and end flanges that are about a foot in diameter. Almost without exception, the enameled wire comes from the tower, over a pulley and onto the spool, remaining within a zone about 2 inches wide in the middle of the spool and building up there, even to a depth of 2 or 3 inches, without spreading to other portions of the spool. With the present invention, however, it was observed that this local-zone build-up did not occur; instead, the enameled wire distributed itself rather evenly all along the entire 6 inch face of the spool.

EXAMPLE II

Example I was repeated, except that a different wire-enamel formulation was used, namely, that of Example V in the copending application of Frank A. Sattler titled "Polyester-Amide-Imide Wire Enamels," Ser. No. 845,482, filed July 28, 1969. It will suffice to describe this wire-enamel formulation as one that is made of the following components, on the weight percent contained-solids basis: 33 ⅓ percent of polyester-amide-imide, made by reaction of trimellitic anhydride with ethylene glycol and isophthalic acid and then further reaction of additional trimellitic anhydride with methylenedianiline; 33 ⅓ percent of a polyester made by the reaction of trimellitic anhydride with ethylene glycol and dimethyl terephthalate; and 33 ⅓ percent of a compatibilizing agent made by the reaction of 1 mol of dimethyl terephthalate with 2 mols of ethylene glycol, reacted then with 2 mols of tolylene diisocyanate and then end-blocked with cresylic acid. In tests to determine the coefficient of friction of the enameled wire, values of 0.043 and 0.088 were found, using the 230 gram weight and the 31.5 gram weight, respectively. Once again, the observed values compare very favorably with those for wire enameled with a similar wire-enamel formulation but without the addition of the dispersed polyethylene of 0.97 specific gravity.

EXAMPLE III

Example I was repeated, except that the dispersion was made using a different vehicle with somewhat different proportions. There were initially mixed 80 grams of the polyethylene of 0.97 specific gravity, 20 grams of tung oil, and 160 grams of a petroleum fraction boiling under atmospheric pressure at 160° to 177°C, such as that sold commerically under the name "Solvesso 100." This was heated to 125°C to produce a melt. The same petroleum fraction (900 grams, at room temperature) was placed in a Cowles dissolver, which was operated at 3,000 rpm., and the melt was added over several minutes with the Cowles dissolver running, so that a dispersion was produced by rapid cooling under high shear conditions. The dispersion so made was used as in Example I, with the same results.

I claim as my invention:

1. A lubricated enameled wire made by
   A. preparing a dispersion of polyethylene containing a volatile suspending agent by rapidly cooling a heated solution of said polyethylene in said volatile suspending agent under high-shear conditions;
   B. mixing said dispersion with a wire enamel to produce a mixture;
   C. applying said mixture to a wire; and
   D. heating said applied mixture to a degree sufficient to evaporate said suspending agent and to cause said wire enamel to become hard when cooled.

2. A lubricated enameled wire according to claim 1 wherein said polyethylene has a density of at least 0.97.

3. A lubricated enameled wire according to claim 2 wherein said polyethylene has an average particle size of 50 microns maximum direction, a melt viscosity of at least 50 centipoises, and a melt index of at least six.

4. A lubricated enameled wire according to claim 1 wherein said dispersion includes a drying oil.

5. A lubricated enameled wire according to claim 4 wherein said dispersion is about 1 to 2 parts by weight polyethylene, about 1 part by weight drying oil, and about 2 to 30 parts by weight volatile suspending agent, and about 0.2 to 2 weight percent of said dispersion is mixed with about 98 to 98.8 weight percent of said wire enamel.

6. A lubricated enameled wire according to claim 1 wherein said volatile suspending agent is a mixture of hydrocarbons boiling in the range 110° to 250°C.

7. A lubricated enameled wire made by
   A. preparing a composition consisting essentially of
      1. about 1 to 2 parts by weight of polyethylene in the form of dendritic spherulites having an average particle size of 50 microns maximum dimension, a density of at least 0.97, a molecular weight indicated by a melt viscosity of at least 50 centipoises, and a melt index of at least six;
      2. about 1 part by weight of a long-chain unsaturated drying oil; and
      3. about 2 to 30 parts by weight of a hydrocarbon fraction boiling in the range 110°–250°C;
   B. heating said composition to dissolve said polyethylene and form a solution;
   C. cooling said solution rapidly under high-shear conditions to form a dispersion;
   D. mixing 0.2 to 2 weight percent of said dispersion with 98 to 99.8 weight percent of a liquid, heatcurable electrically insulating resinous enamel composition, thereby producing a dispersion-treated wire-enamel formulation; and
   E. applying to and curing onto wire said dispersion-treated wire-enamel formulation.

8. A lubricated enameled wire according to claim 1 wherein said wire enamel is a formulation selected from the group consisting of polyvinyl acetals, aromatic polyamides, epoxies, polyurethanes, polyesters, polyamide-imides, polyester-amide-imides, polyvinylbutyral, silicone-based resins and polymeric-amide-imide ester blended with an ester-urethane isocyanate.

9. A lubricated enameled wire according to claim 8 wherein said wire enamel is a polymeric-amide-imide ester blended with an ester-urethane isocyanate.

* * * * *